United States Patent
Tarao et al.

(10) Patent No.: US 11,447,154 B2
(45) Date of Patent: Sep. 20, 2022

(54) VEHICLE TRAVEL SYSTEM

(71) Applicant: TOYOTA JIDOSHA KABUSHIKI KAISHA, Toyota (JP)

(72) Inventors: Kohta Tarao, Nagoya (JP); Hiroki Awano, Tokyo-to (JP); Kuniaki Jinnai, Nagoya (JP); Yoshihiro Maekawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 16/935,572

(22) Filed: Jul. 22, 2020

(65) Prior Publication Data
US 2021/0031798 A1    Feb. 4, 2021

(30) Foreign Application Priority Data
Jul. 29, 2019    (JP) .............................. JP2019-139209

(51) Int. Cl.
*B60W 60/00* (2020.01)
*B60W 40/08* (2012.01)
*G05D 1/00* (2006.01)

(52) U.S. Cl.
CPC .......... *B60W 60/005* (2020.02); *B60W 40/08* (2013.01); *G05D 1/0011* (2013.01)

(58) Field of Classification Search
None
See application file for complete search history.

(56) References Cited

U.S. PATENT DOCUMENTS

| | | | |
|---|---|---|---|
| 11,188,074 B1 * | 11/2021 | Benavidez | G05D 1/0061 |
| 2014/0207535 A1 * | 7/2014 | Stefan | G07C 5/008 |
| | | | 705/7.42 |
| 2019/0163176 A1 * | 5/2019 | Wang | G05D 1/0038 |
| 2020/0282980 A1 * | 9/2020 | Kinoshita | G06K 9/00791 |

FOREIGN PATENT DOCUMENTS

| | | |
|---|---|---|
| JP | 2006-301963 A | 11/2006 |
| JP | 2016-215658 A | 12/2016 |
| JP | 2019-026412 A | 2/2019 |
| JP | 2019-051998 A | 4/2019 |

* cited by examiner

*Primary Examiner* — James J Lee
*Assistant Examiner* — David Hatch
(74) *Attorney, Agent, or Firm* — Oliff PLC (57) ABSTRACT

In a vehicle travel system for a vehicle that is switchable at least between manual driving and remote driving, the vehicle includes a memory, and a processor connected to the memory. The processor acquires driver information related to a driver that manually drives the vehicle. The driver information indicates a specific situation during a time of manual driving. The processor enables manual driving to be switched to remote driving upon occurrence of the specific situation indicated by the acquired driver information.

14 Claims, 9 Drawing Sheets

VEHICLE TRAVEL SYSTEM

CROSS-REFERENCE TO RELATED APPLICATION

This application claims priority under 35 USC 119 from Japanese Patent Application No. 2019-139209, filed on Jul. 29, 2019, the disclosure of which is incorporated by reference herein in its entirety.

BACKGROUND

Technical Field

The present disclosure relates to a vehicle travel system.

Related Art

Japanese Patent Application Laid-Open No. 2016-215658 discloses a technique for controlling automatic driving according to the driving skill or proficiency of a driver. In this prior art, information on a driving technique at the time of manual driving by a driver is acquired, and based on an analysis result of the driving technique of the driver, automatic driving is controlled according to the driving skill or proficiency of the driver. In the state of automatic driving, driving equivalent to the driving skill of the driver is performed. In the above-mentioned related art, even if the driving is switched from automatic driving to manual driving due to a sudden factor or the like, the driver can take over according to his/her own driving skill or proficiency.

SUMMARY

In the above-mentioned related art, since the automatic driving is controlled in accordance with the driving skill or proficiency of the driver, it is possible to smoothly switch the driving state from automatic driving to manual driving. However, although the switching is smooth, the driving may be switched to manual driving in a situation in which the driver is not competent (hereinafter, referred to as a "specific situation"). There is room for further study on the switching of the driving state.

The present disclosure provides a vehicle travel system that allows a driver to avoid manual driving in a specific situation. A vehicle travel system according to a first aspect of the present disclosure is a vehicle travel system for a vehicle that is configured to be switchable between at least manual driving and remote driving, the vehicle including a memory and a processor connected to the memory. The processor acquires driver information related to a driver who manually drives the vehicle. The driver information indicates a specific situation during a time of the manual driving. The processor enables the manual driving to be switched to the remote driving upon occurrence of the specific situation indicated by the acquired driver information.

In the vehicle travel system of the first aspect, driver information, which indicates a specific situation during a time of manual driving with respect to the driver, is acquired by a processor.

Here, "configured to be switchable between at least manual driving and remote driving" is intended to include a case of switching to automatic driving in addition to cases of switching to the manual driving or the remote driving. The "specific situation" refers to a situation in which the driver is not competent for driving.

Further, in the present disclosure, it is possible to switch the manual driving to the remote driving in the acquired specific situation. In this way, the vehicle can be remotely driven by switching the vehicle from the manual driving to the remote driving.

That is, in the present disclosure, when the remote driving is required, the remote driving is performed by an operator, and the driver can avoid the manual driving in a specific situation.

It should be noted that "enables to switch the manual driving to the remote driving" here is intended to include a case in which there is no switching from the manual driving to the remote driving even in the specific situation, in addition to a case in which there is switching from the manual driving to the remote driving by the processor in the specific situation. For example, there are cases in which the driver performs the manual driving in accordance with advice information from the remote operator.

The vehicle travel system according to a second aspect of the present disclosure is the vehicle travel system according to the first aspect, in which the specific situation is at least one of situations that (i) the driver manually drives at a location that is difficult for the driver to drive or (ii) the driver manually drives in a condition that is difficult for the driver to drive.

In the vehicle travel system according to the second aspect, it is possible to switch from the manual driving to the remote driving in a specific situation.

Here, a "location that is difficult for the driver to drive" is a location at which the driver is not competent at driving, such as a high-speed junction, a narrow parking lot, a narrow road, or the like. A "condition that is difficult for the driver to drive" is such as when an oncoming vehicle is approaching on a narrow road, or when it is raining. Additionally, the "condition" includes states in which the driver is uncomfortable about driving such as a state in which the driver has just recently obtained his license or a state of driving a specific vehicle type.

In a vehicle travel system according to a third aspect of the present disclosure, in the vehicle travel system according to the first aspect or the second aspect, the processor stores the specific situations in advance in accordance with input by the driver.

In the vehicle travel system according to the third aspect, the specific situations are stored in advance by the processor in accordance with the driver's input. When a destination is input using a navigation system that provides road guidance to the destination, the specific situations stored in advance—that is, driver information—is acquired by the processor.

A vehicle travel system according to a fourth aspect of the present disclosure is the vehicle travel system according to any one of the first aspect to the third aspect, further including a remote operation device connected to the vehicle, and configured for an operator to operate the remote operation device and remotely drive the vehicle.

A vehicle travel system according to a fifth aspect of the present disclosure is the vehicle travel system according to the fourth aspect, in which the processor is configured to receive advice information from the operator in the specific situation.

In the vehicle travel system according to the fifth aspect, the driver that performs the manual driving can receive advice from the operator by enabling the reception of advice information from the operator in the specific situation. The driver can improve his/her driving skills and overcome the specific situation.

In the vehicle travel system according to a sixth aspect of the present disclosure, in the vehicle travel system according to the fourth aspect, the processor transmits a switching notification to the remote operation device in a case of switching from the manual driving to the remote driving.

In the vehicle travel system according to the sixth aspect, in a case of switching from the manual driving to the remote driving, the processor transmits a switching notification to the operator performing the remote driving. Thereby, the operator recognizes that there will be a switch from the manual driving to the remote driving.

A vehicle travel system according to a seventh aspect of the present disclosure is the vehicle travel system according to the sixth aspect, in which the remote operation device includes a memory and a processor connected to the memory, and the processor of the remote operation device, after receiving the switching notification regarding switching from the manual driving to the remote driving from the processor of the vehicle, outputs a switching signal that performs switching to the remote driving to the processor of the vehicle.

The vehicle travel system according to an eighth aspect of the present disclosure is the vehicle travel system according to the seventh aspect, in which the processor of the vehicle, after receiving a switching notification regarding switching from the remote driving to the manual driving from the processor of the remote operation device, outputs a switching signal that performs switching to the manual driving.

A method of vehicle control according to a ninth aspect of the present disclosure is a method of vehicle control for a vehicle that is configured to be switchable between at least manual driving and remote driving, the method being performed by a processor configured to perform the steps of: acquiring driver information related to a driver that manually drives the vehicle, the driver information indicating a specific situation during a time of the manual driving, and switching the manual driving to the remote driving upon occurrence of the specific situation indicated by the acquired driver information.

A vehicle control method according to a tenth aspect of the present disclosure is the vehicle control method according to the ninth aspect, in which the specific situation is at least one of situations that (i) the driver manually drives at a location that is difficult for the driver to drive or that (ii) the driver manually drives in a condition that is difficult for the driver to drive.

In a vehicle control method according to an eleventh aspect of the present disclosure, in the ninth aspect or the tenth aspect, the processor stores the specific situations in advance in accordance with input by the driver.

A vehicle control method according to a twelfth aspect of the present disclosure is the vehicle control method according to any one of the ninth aspect to the eleventh aspect, in which the remote driving includes an operator remotely driving the vehicle by operating a remote operation device that is separate from the vehicle.

In a vehicle control method according to a thirteenth aspect of the present disclosure, in the twelfth aspect, the processor is configured to receive advice information from the operator in the specific situation.

In a vehicle control method according to a fourteenth aspect of the present disclosure, in the twelfth aspect, the processor transmits a switching notification to the remote operation device in a case of switching from the manual driving to the remote driving.

The vehicle travel system according to the first aspect has the excellent effect that the manual driving in the specific situation can be avoided.

The vehicle travel system according to the second aspect has the excellent effect that the specific situation can be defined to cover a wide range of situations in which the driver is not competent at driving.

The vehicle travel system according to the third aspect has the excellent effect that the specific situations stored in advance can be acquired.

The vehicle travel system according to the fourth aspect has the excellent effect that switching from the manual driving to the remote driving by an operator can be performed in the specific situation.

The vehicle travel system according to the fifth aspect has the excellent effect that the driver can improve their driving technique and overcome the specific situation by receiving advice from the operator in the specific situation.

The vehicle travel system according to the sixth aspect has the excellent effect that an operator can be informed in advance that switching from the manual driving to the remote driving is to be performed.

The vehicle travel systems according to the seventh and eighth aspects have the excellent effect that switching between the manual driving and the remote driving can be performed as needed.

The vehicle control method according to the ninth aspect has the excellent effect that the manual driving in the specific situation can be avoided.

The vehicle control method according to the tenth aspect has the excellent effect that the specific situation can be defined to cover a wide range of situations in which the driver is not competent at driving.

The vehicle control method according to the eleventh aspect has the excellent effect that the specific situations stored in advance can be acquired.

The vehicle control method according to the twelfth aspect has the excellent effect that switching from the manual driving to the remote driving by an operator can be performed in the specific situation.

The vehicle control method according to the thirteenth aspect has the excellent effect that the driver can improve their driving technique and overcome the specific situation by receiving advice from the operator in the specific situation.

The vehicle control method according to the fourteenth aspect has the excellent effect that an operator can be informed in advance that switching from the manual driving to the remote driving is to be performed.

BRIEF DESCRIPTION OF THE DRAWINGS

Preferred embodiments will be described in detail based on the following figures, wherein.

DETAILED DESCRIPTION

Outline

First, an outline of the vehicle travel system of the present embodiment will be described.

Figure 1:
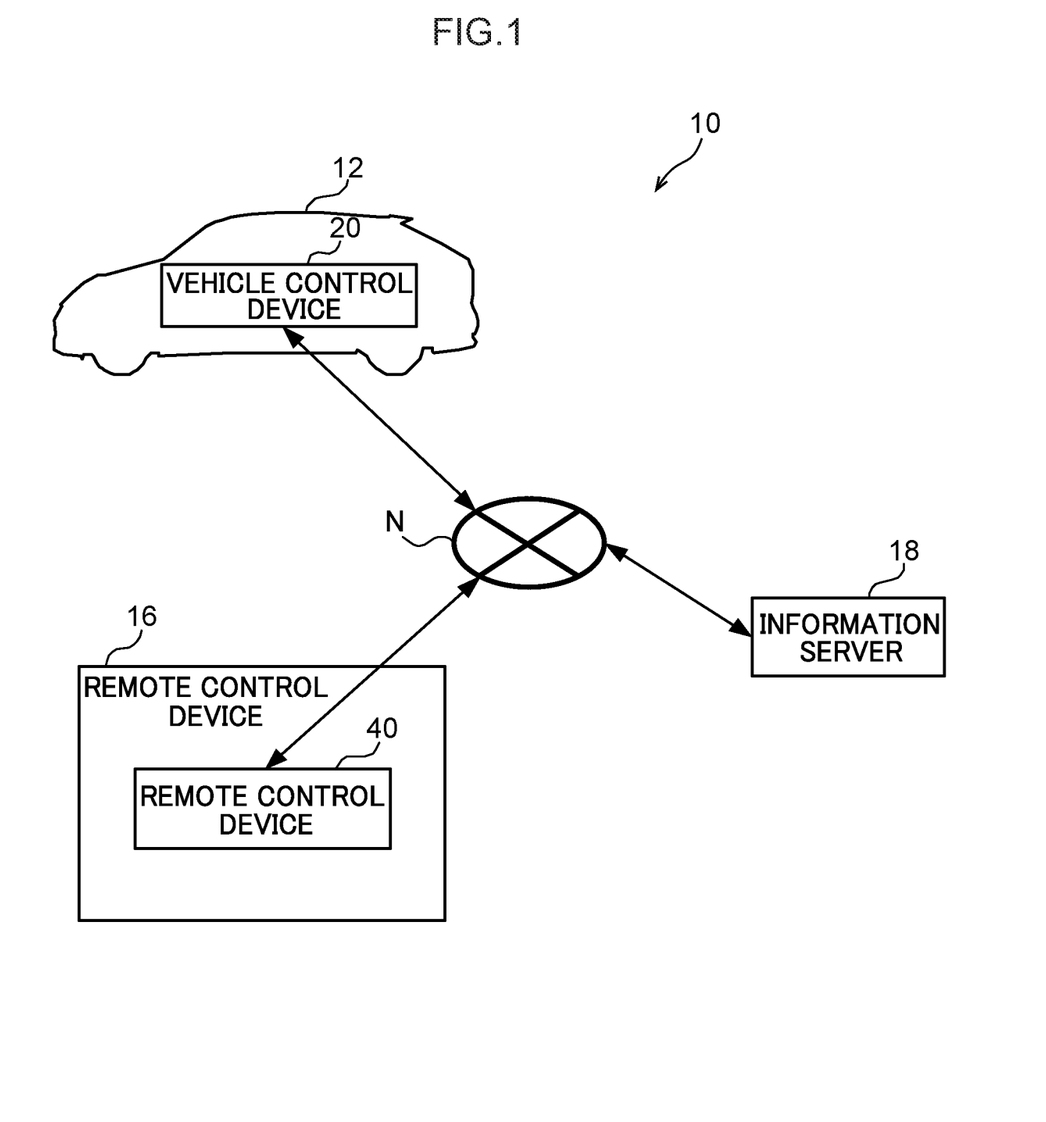
FIG. 1 is a configuration diagram showing a schematic configuration of a vehicle travel system according to the present embodiment.

FIG. 1 is a diagram illustrating a schematic configuration of a vehicle travel system 10 according to the present embodiment. As shown in FIG. 1, the vehicle travel system 10 includes a vehicle 12 capable of manual driving and remote driving, a remote control device 16 for remotely driving the vehicle 12, and an information server 18.

The vehicle 12 includes a vehicle control device 20, and the remote control device 16 includes a remote control device 40. In the vehicle travel system 10, the vehicle control device 20, the remote control device 40, and the information server 18 are mutually connected via a network N.

Although the vehicle travel system 10 in FIG. 1 includes one vehicle 12, one remote control device 16, and one information server 18, the numbers are not limited to this. The vehicle travel system 10 may include two or more vehicles 12, and may include two or more remote control devices 16 and two or more information servers 18.

Further, the vehicle 12 is capable of manual operation based on an operation of a driver and remote operation based on an operation of a remote driver or an operator in the remote operation device 16. However, automatic driving may be set in place of remote driving.

Vehicle

Figure 2:
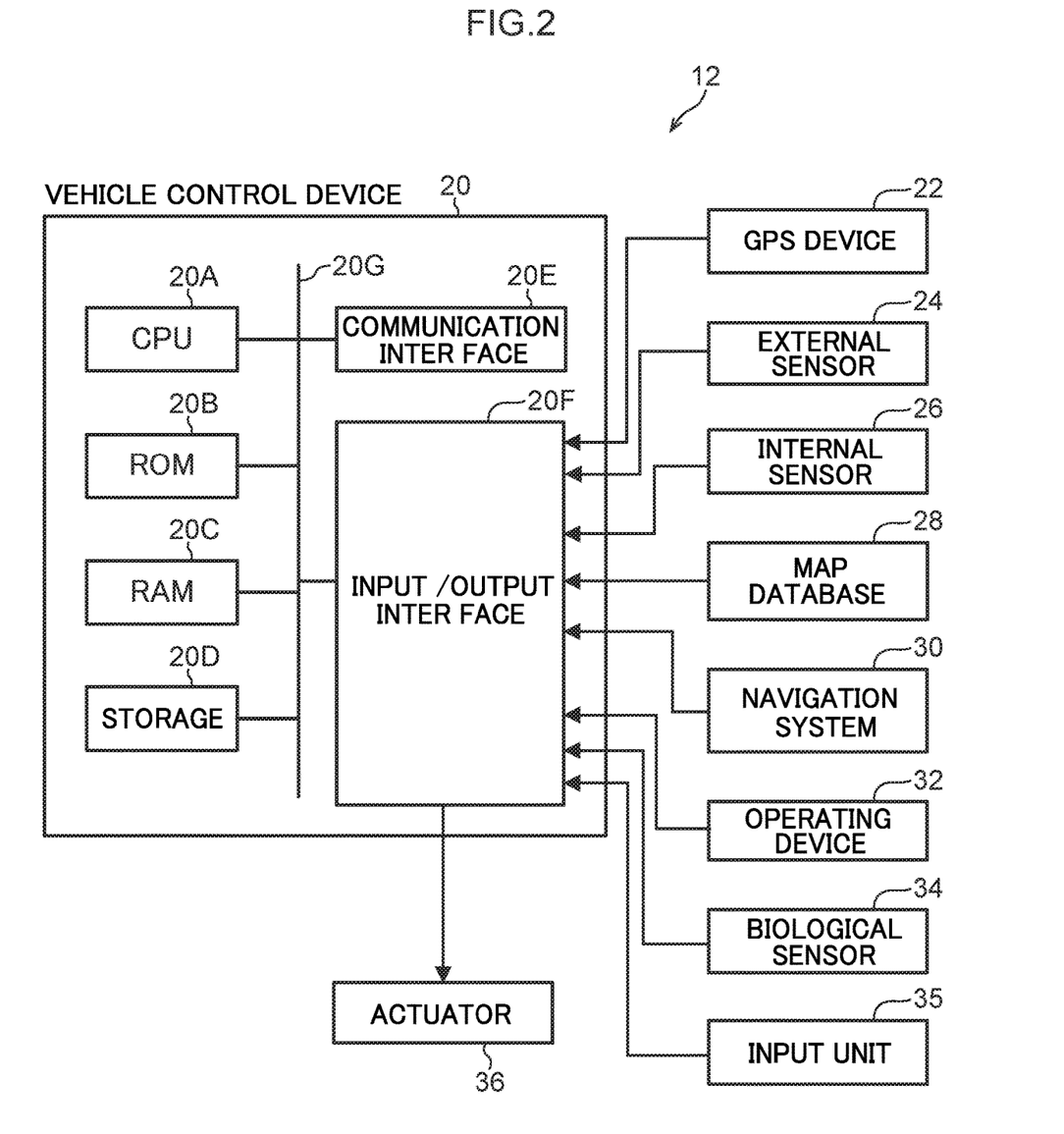
FIG. 2 is a block diagram showing a hardware configuration of a vehicle used in the vehicle travel system according to the present embodiment.

FIG. 2 is a block diagram showing a hardware configuration of devices mounted on the vehicle 12 used in the vehicle travel system according to the present embodiment.

As shown in FIG. 2, in addition to the above-described vehicle control device 20, the vehicle 12 includes a GPS: Global Positioning System device 22, an external sensor 24, an internal sensor 26, a map database 28, a navigation system 30, an operation device 32, a living body sensor 34, an input unit 35, and an actuator 36.

The vehicle control device 20 includes a CPU: Central Processing Unit 20A, a ROM: Read Only Memory 20B, a RAM: Random Access Memory 20C, a storage 20D, a communication Inter Face 20E, and an input/output Inter Face 20F. The CPU 20A, the ROM 20B, the RAM 20C, the storage 20D, the communication I/F 20E, and the input/output I/F 20F are connected so as to be capable of communicating with each other through a bus 20G.

The CPU 20A executes various programs, and controls each unit. Namely, the CPU 20A reads a program from the ROM 20B, and executes the program employing the RAM 20C as a workspace. In the present exemplary embodiment, an execution program is stored in the ROM 20B.

Figure 3:
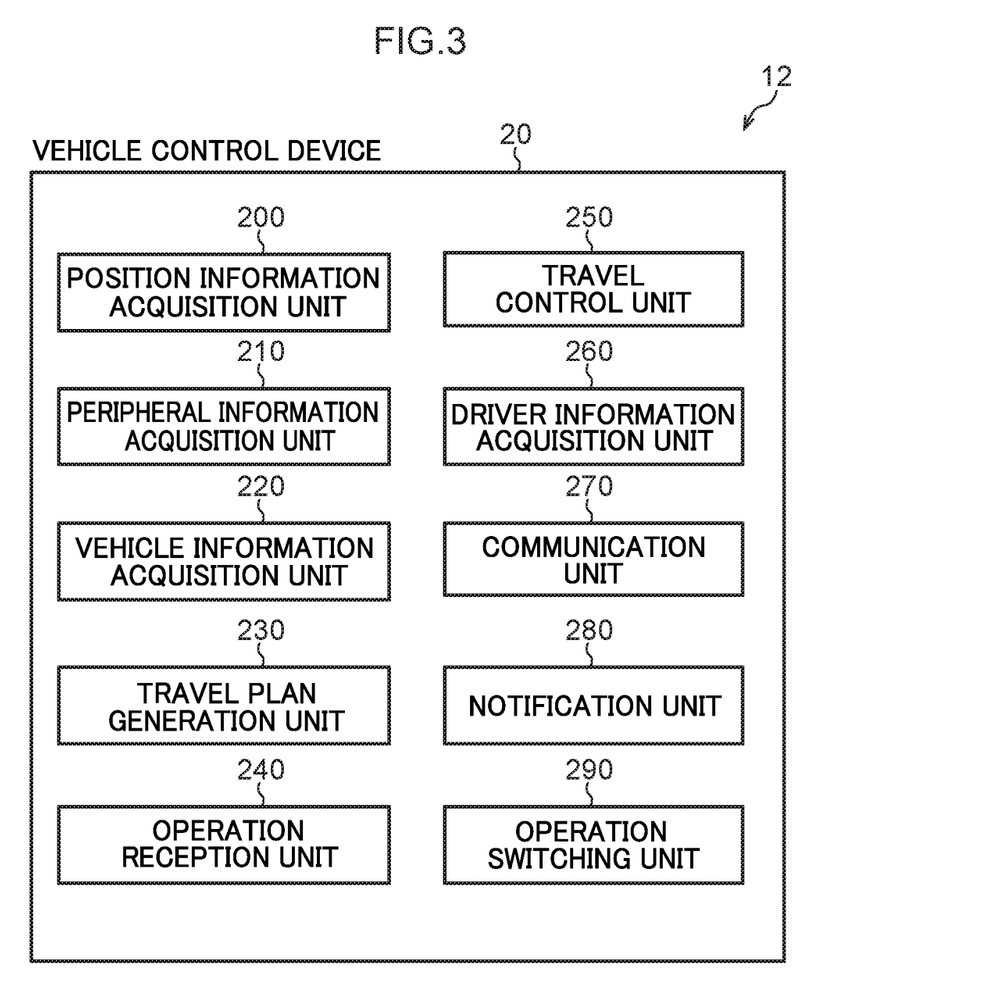
FIG. 3 is a block diagram showing a functional configuration of a vehicle control device for a vehicle used in the vehicle travel system according to the present embodiment.

When the CPU 20A executes the execution program, the vehicle control device 20 functions as the position acquisition unit 200, the peripheral information acquisition unit 210, the vehicle information acquisition unit 220, the travel plan generation unit 230, the operation reception unit 240, the travel control unit 250, the driver information acquisition unit 260, the communication unit 270, the notification unit 280, and the operation switching unit 290 shown in FIG. 3, which are described below. FIG. 3 is a block diagram illustrating an example of a functional configuration of vehicle control device 20 in vehicle 12 used in vehicle travel system 10 according to the present embodiment.

As described above, the ROM 20B shown in FIG. 2 stores various programs and various data. The RAM 20C acts as a workspace for temporary storage of programs and data.

The storage 20D is configured by a Hard Disk Drive (HDD) or a Solid State Drive (SSD), and stores various programs including an operating system, as well as various data. The storage 20D stores driver information described later in association with the driver.

The communication I/F 20E includes an interface for connecting to the network N in order to communicate with the remote control device 40 and the information server 18 shown in FIG. 1, for example. The interface uses, for example, communication standards such as LTE and Wi-Fi: registered trademark.

The communication I/F 20E illustrated in FIG. 2 may use Dedicated Short Range Communications (DSRC) or the like. The communication I/F 20E of the present embodiment transmits an image captured by a camera to a remote control device 16 outside the vehicle 12 via the network N, and receives remote operation information for operating the vehicle 12 from the remote control device 16.

The input/output I/F 20F includes an interface for communicating with the various devices mounted to the vehicle 12. The vehicle control device 20 is connected to a GPS device 22, an external sensor 24, an internal sensor 26, a map database 28, a navigation system 30, an operation device 32, a biological sensor 34, an input unit 35, and an actuator 36 via an input/output I/F 20F.

The GPS device 22, the external sensor 24, the internal sensor 26, the map database 28, the navigation system 30, the operating device 32, the biological sensor 34, the input unit 35, and the actuator 36 may be directly connected to the bus 20G. These may be connected to the vehicle control device 20 via a CAN (Controller Area Network), or may be connected to the vehicle control device 20 via various ECUs or gateway ECUs.

The GPS device 22 is a device that measures the current position of the vehicle 12, and includes an antenna that receives a signal from a GPS satellite. Specifically, the GPS device 22 measures the position of the vehicle 12, for example, the latitude and longitude of the vehicle, by receiving signals from three or more GPS satellites. The measured position information of the vehicle 12 is transmitted to the input/output I/F 20F, and transmitted to the device connected to the input/output I/F 20F. Note that, instead of the GPS device 22, another unit that can specify the latitude and longitude of the vehicle 12 may be used.

The external sensor 24 is a sensor group that detects information on the surroundings of the vehicle 12. The external sensor 24 is configured to include at least one of a camera that captures an image of a predetermined range, a radar that transmits a search wave to the predetermined range, and a Lidar (Laser Imaging Detection and Ranging) that scans the predetermined range.

Although not shown, the camera is provided, for example, on the indoor side above the windshield glass of the vehicle 12, and captures image information by imaging an external situation of the vehicle. The image information obtained by the camera is transmitted to the input/output I/F 20F, and transmitted to a device connected to the input/output I/F 20F. Note that the camera may be a monocular camera or a stereo camera. In the case of a stereo camera, it has two imaging units arranged to reproduce binocular parallax. The imaging information of the stereo camera also includes information on the depth direction.

The radar transmits a radio wave, for example, a millimeter wave, around the vehicle 12, and measures the distance to an obstacle by receiving the radio wave reflected by the obstacle. Obstacle information detected by the radar is transmitted to the input/output I/F 20F, and transmitted to a device connected to the input/output I/F 20F.

The Lidar transmits light around the vehicle 12 and receives the light reflected by the obstacle to measure the distance to the reflection point to detect the obstacle. Obstacle information detected by the Lidar is transmitted to the input/output I/F 20F, and transmitted to a device connected to the input/output I/F 20F. Note that it is not necessary to provide all of the camera, radar, and Lidar.

The internal sensor 26 is a sensor that detects a vehicle state such as a traveling state by detecting various physical quantities when the vehicle 12 travels. Although not shown, for example, it includes at least one of a vehicle speed sensor, an acceleration sensor, and a yaw rate sensor.

The vehicle speed sensor is provided, for example, on a vehicle wheel, a hub or rotor that rotates integrally with the wheel, a drive shaft, or the like, and detects the vehicle speed by detecting the rotational speed of the wheel. Vehicle speed information (wheel speed information) detected by the vehicle speed sensor is transmitted to the input/output I/F 20F, and can be transmitted to a device connected to the input/output I/F 20F.

The acceleration sensor detects acceleration generated by acceleration/deceleration, turning, collision, and the like of the vehicle. The acceleration sensor includes, for example, a longitudinal acceleration sensor that detects longitudinal acceleration of the vehicle, a lateral acceleration sensor that detects left-right lateral acceleration of the vehicle, and a vertical acceleration sensor that detects vertical acceleration of the vehicle. The acceleration information of the vehicle is transmitted to the input/output I/F 20F, and can be transmitted to a device connected to the input/output I/F 20F.

The yaw rate sensor detects a yaw rate about a vertical axis of the center of gravity of the vehicle, that is, a rotational angular velocity. For example, a gyro sensor can be used as the yaw rate sensor. The yaw rate information detected by the yaw rate sensor is transmitted to the input/output I/F 20F, and can be transmitted to a device connected to the input/output I/F 20F.

The map database 28 is a database including map information, and is stored in, for example, an HDD mounted on the vehicle 12. The map information includes, for example, road position information, for example, information of a road shape such as a curve, a type of a straight line portion, and a curvature of a curve, and position information of an intersection and a branch point.

Further, the output signal of the external sensor 24 may be included in the map information in order to use the position information of a shielding structure such as a building or a wall, or the SLAM: Simultaneous Localization and Mapping technology. Although not shown, the map database 28 may be stored in a computer such as an information processing center that can communicate with the vehicle 12.

The navigation system 30 is a system that provides guidance to the driver to a destination set by the driver, and calculates a route that the vehicle 12 travels based on position information of the vehicle 12 measured by the GPS device 22 and map information in the map database 28. The route may specify a suitable lane in an area with plural lanes.

Further, the navigation system 30 calculates, for example, a target route from the position of the vehicle 12 to the destination, displays the target route on a display, and notifies the occupant of the target route by a speaker. Further, information on the target route of the vehicle 12 by the navigation system 30 is transmitted to the input/output I/F 20F, and can be transmitted to a device connected to the input/output I/F 20F.

The operation device 32 is a group of switches for the driver to operate. The operation device 32 includes a steering wheel as a switch for steering the steered wheels of the vehicle 12, an accelerator pedal as a switch for accelerating the vehicle 12, and a brake pedal as a switch for decelerating the vehicle 12. The travel information from the operation device 32 is transmitted to the input/output I/F 20F, and can be transmitted to a device connected to the input/output I/F 20F.

The biological sensor 34 is a sensor that can detect the driver's physical information. The driver's physical information includes, for example, biological information such as the driver's pulse, brain waves, blood pressure, and heart rate. In addition, the setting may be made so that image information such as the facial expression of the driver can be obtained using a camera. From this information, it is detected whether or not the driver is nervous.

Here, it is presumed that the driver is in a specific situation by detecting that the driver is nervous. Then, the body information detected by the biological sensor 34 is transmitted to the input/output I/F 20F. The biosensor 34 is not always necessary.

The input unit 35 allows a driver to input a so-called "specific situation". Here, the "specific situation" refers to, for example, a situation where the driver manually drives in a place where he is not good at and a situation where the driver manually drives in a state where he is not good at. The "place where he is not good at" is a place that is not easy for driving, such as a high-speed junction or a narrow parking lot. The "state where he is not good at" includes a state in which he is not competent at driving, such as when an oncoming vehicle is approaching, or when it is raining, and also includes a state in which he is uncomfortable with driving such as when he has just recently obtained his license or a state of driving a specific vehicle type. Further, the specific situation input by the input unit 35 is transmitted to the input/output I/F 20F.

The actuator 36 includes a steering actuator as a steering mechanism, an accelerator actuator, and a brake actuator. The steering actuator steers the front wheels of the vehicle 12. The accelerator actuator controls the traveling motor to accelerate the vehicle 12. Further, the brake actuator decelerates the vehicle 12 by controlling the brake.

As described above, the vehicle control device 20 illustrated in FIG. 3 includes the position acquisition unit 200, the peripheral information acquisition unit 210, the vehicle information acquisition unit 220, the travel plan generation unit 230, the operation reception unit 240, the travel control unit 250, the driver information acquisition unit 260, a communication unit 270, a notification unit 280, and an operation switching unit 290. The function of each configuration is realized by CPU 20A shown in FIG. 2 reading out an execution program stored in ROM 20B and executing the program.

The position acquisition unit 200 illustrated in FIG. 3 has a function of acquiring the current position of the vehicle 12, and acquires the position information of the vehicle 12 from the GPS device 22 via the input/output I/F 20F.

The peripheral information acquisition unit 210 has a function of acquiring peripheral information of the vehicle 12, and acquires peripheral information of the vehicle 12 from the external sensor 24 via the input/output I/F 20F. The peripheral information includes not only vehicles and pedestrians around the vehicle 12, but also weather, brightness, width of a traveling road, obstacles, and the like.

The vehicle information acquisition unit 220 has a function of acquiring vehicle information such as the vehicle speed, acceleration, and yaw rate of the vehicle 12. The vehicle information acquisition unit 220 acquires vehicle information of the vehicle 12 from the internal sensor 26 via the input/output I/F 20F.

The travel plan generation unit 230 has the function of generating a travel plan for the vehicle 12 to travel by the navigation system 30 (see FIG. 2) via the input/output I/F 20F based on the position information acquired by the position acquisition unit 200, the peripheral information acquired by the peripheral information acquisition unit 210, and the vehicle information acquired by the vehicle information acquisition unit 220. The travel plan includes not only a travel route to a preset destination, but also information such as a course for avoiding an obstacle in front of the vehicle 12 and a speed of the vehicle 12.

The operation reception unit 240 has a function of receiving a signal output from the operating device 32 (see FIG. 2) via the input/output I/F 20F when manual driving based on the operation of the driver is performed. Then, the operation reception unit 240 generates vehicle operation information that is operation information for controlling the actuator 36 via the input/output I/F 20F based on the signal received from the operation device 32.

The travel control unit 250 has a function of controlling manual driving based on the vehicle operation information received from the operation reception unit 240 and remote driving based on the remote operation information received from the remote operation device 16.

The driver information obtaining unit 260 obtains driver information indicating a specific situation of the driver during manual driving. For example, the driver information can be input in advance by the driver via the input unit 35 (see FIG. 2), and the driver information is stored in the storage 20D in a state in which the driver information is associated with the driver as described above.

When the driver information is acquired by the driver information acquisition unit 260 and the destination is input by the navigation system 30, an incompetent place that creates a specific situation is detected in the route to the destination.

Figure 5:
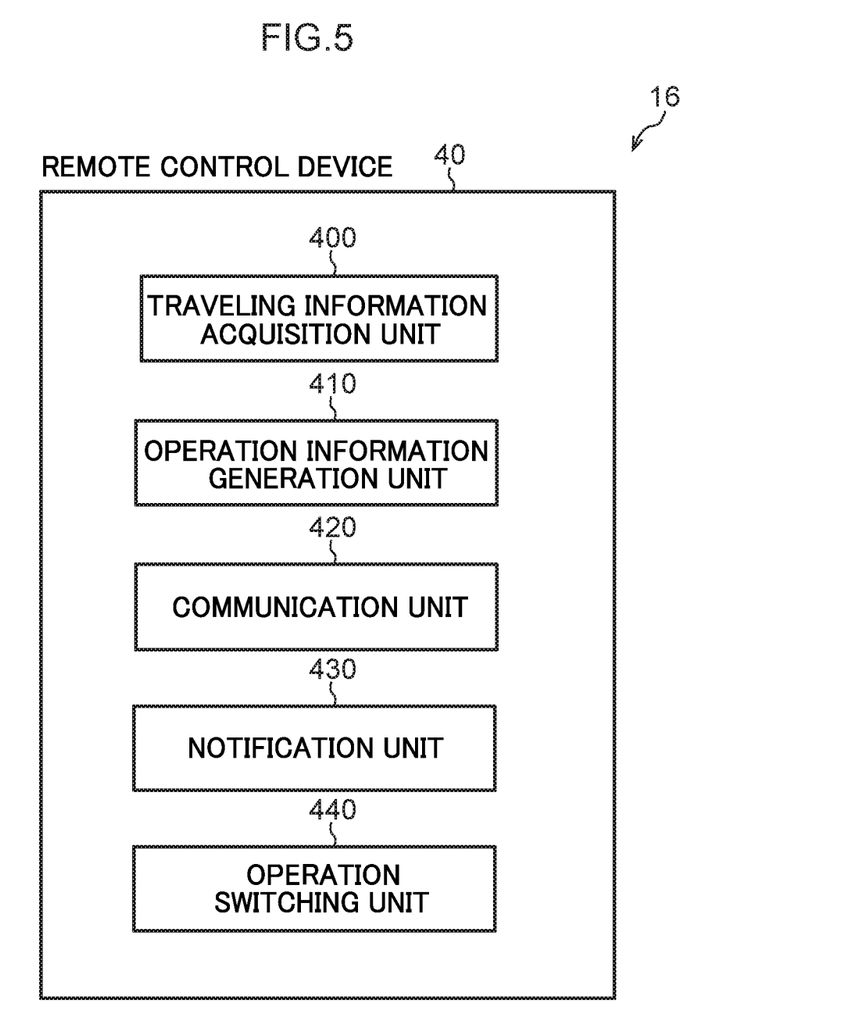
FIG. 5 is a block diagram showing a functional configuration of a remote control device used in the vehicle travel system according to the present embodiment.

The communication unit 270 has a function of transmitting and receiving information to and from the communication unit 420 of the remote control device 40 shown in FIG. 5. Communication unit 270 transmits information to the remote control device 40 when CPU 20A of the vehicle control device 20 determines that manual driving is difficult.

The communication unit 270 receives the remote operation information generated by the operation information generation unit 410 illustrated in FIG. 5. Further, the communication unit 270 can receive advice information from a remote driver operating the remote operation device 16.

The notification unit 280 has the function of receiving the information transmitted from the communication unit 270 when the CPU 20A determines that the manual driving is difficult, and sending a switching notification indicating that the driving is difficult to the remote control device 16. Note that the notification unit 280 also has a function of receiving a switching notification transmitted from the remote operation device 16 to the vehicle control device 20 for switching from the remote operation to the manual operation.

The operation switching unit 290 has a function of transferring the operation authority, which is the authority for operating the vehicle 12 on which the vehicle control device 20 is mounted, to the remote driver operating the remote operation device 16, and switching the operation.

In the operation switching unit 290, when a driver performing the manual operation operates a switch such as a switching button (not shown), a switching signal or a switching preparation signal for switching from the manual operation to the remote operation is output to the remote operation device 16. Thereby, the operation authority of the vehicle control device 20 can be switched to the remote operation device 16.

As described above, when the operation authority is transferred to the remote driver, the vehicle control device 20 transmits the authority transfer command to the remote operation device 16 operated by the remote driver. The transmission of the authority transfer command may be performed at the same time as the notification of the driving difficulty to the remote control device 16 or may be performed after the notification of the driving difficulty.

When the operation authority is transferred from the vehicle 12 to the remote driver, in the vehicle 12, the travel control unit 250 causes the vehicle 12 to travel based on the remote operation information received from the remote operation device 16. That is, the vehicle 12 is switched from the manual driving to the remote driving, and the remote driving is performed by the remote driver.

(Remote Operation Device)

Figure 4:
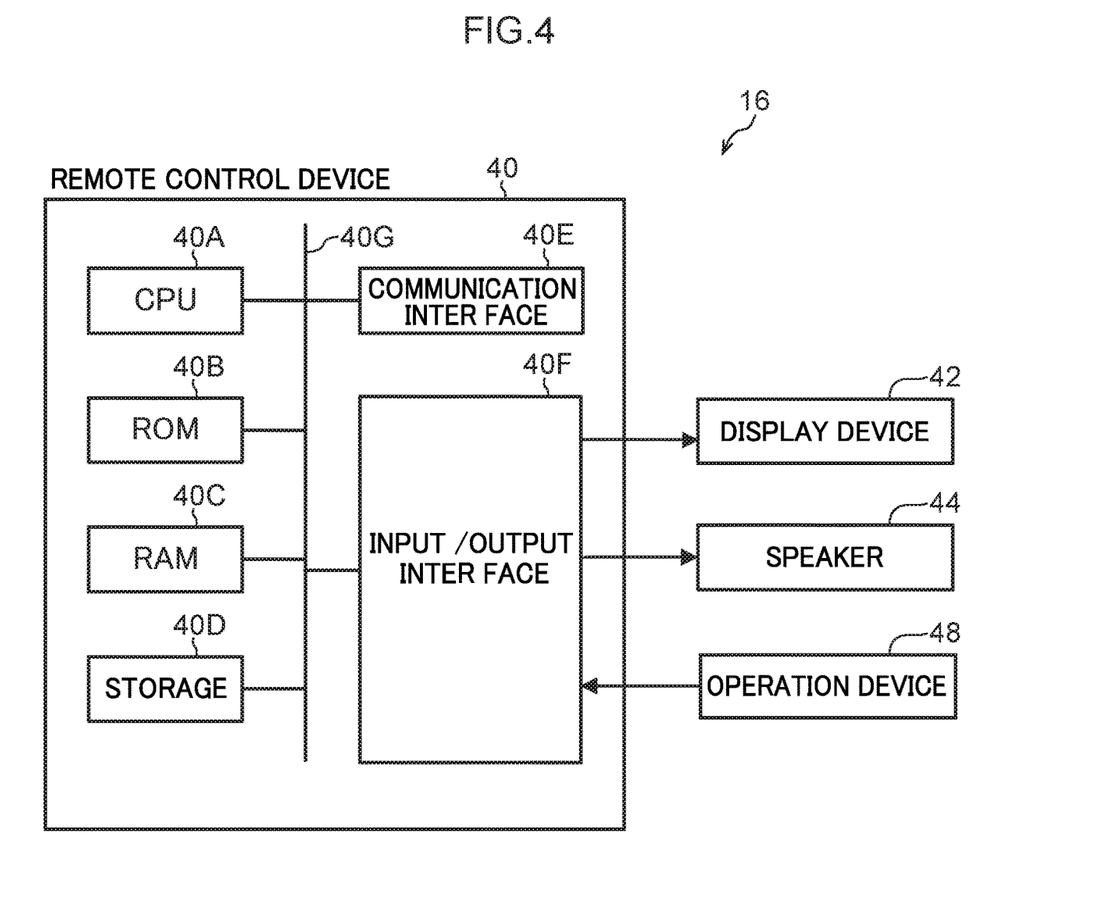
FIG. 4 is a block diagram showing a hardware configuration of a remote control device used in the vehicle travel system according to the present embodiment.

FIG. 4 is a block diagram illustrating a hardware configuration of devices installed in the remote operation device 16 of the present exemplary embodiment.

The remote control device 16 includes a display device 42, a speaker 44, and an operation device 48 in addition to the above-described remote control device 40. Further, the remote control device 40 includes a CPU 40A, a ROM 40B, a RAM 40C, a storage 40D, a communication I/F 40E, and an input/output I/F 40F. The CPU 40A, the ROM 40B, the RAM 40C, the storage 40D, the communication I/F 40E, and the input/output I/F 40F are connected so as to be capable of communicating with each other through a bus 40G.

The functions of the CPU 40A, the ROM 40B, the RAM 40C, the storage 40D, the communication I/F 40E, and the input/output I/F 40F are substantially the same as those of the CPU 20A, ROM 20B, RAM 20C, storage 20D, communication I/F 20E and input/output I/F 20F of the vehicle control device 20 shown in FIG. 2 and discussed above.

The CPU 40A shown in FIG. 4 reads a program from the ROM 40B, and executes the program employing the RAM 40C as a workspace. In the present exemplary embodiment, a processing program is stored in the ROM 40B.

When the CPU 40A executes the processing program, the remote control device 40 functions as the traveling information acquisition unit 400, the operation information generation unit 410, the communication unit 420, the notification unit 430, and the operation switching unit 440 illustrated in FIG. 5. FIG. 5 shows a block diagram illustrating an example of a functional configuration of vehicle control device 40 used in vehicle travel system 10 according to the present embodiment.

As shown in FIG. 4, a display device 42, a speaker 44, and an operation device 48 are connected to the remote control device 40 of the present embodiment via an input/output I/F 40F. The display device 42, the speaker 44, and the operation device 48 may be directly connected to the bus 40G.

The display device 42 is a liquid crystal monitor for displaying an image captured by the camera of the vehicle 12 and various kinds of information related to the vehicle 12.

The speaker 44 reproduces sound recorded together with the captured image using a microphone attached to the camera of the vehicle 12.

The operation device 48 is a controller for operation by a remote driver as a remote driver using the remote operation device 16. The operation device 48 includes a steering wheel as a switch for steering the steered wheels of the vehicle 12, an accelerator pedal as a switch for accelerating the vehicle 12, and a brake pedal as a switch for decelerating the vehicle 12.

The form of each operation device 48 is not limited to this. For example, a lever switch may be provided instead of the steering wheel. Further, for example, a push button switch or a lever switch may be provided instead of the pedal switch of the accelerator pedal or the brake pedal.

As described above, the remote control device 40 illustrated in FIG. 5 includes the travel information acquisition unit 400, the operation information generation unit 410, the communication unit 420, the notification unit 430, and the operation switching unit 440.

The traveling information acquisition unit 400 has a function of acquiring a captured image and audio of a camera transmitted from the vehicle control device 20, and vehicle information such as a vehicle speed. The acquired captured image and vehicle information are displayed on the display device 42, and audio information is output from the speaker 44.

The operation information generation unit 410 has a function of receiving a signal output from each operation device 48 when the remote operation based on an operation of the remote driver is performed. Further, the operation information generation unit 410 generates remote operation information to be transmitted to the vehicle control device 20 based on a signal received from each operation device 48.

The communication unit 420 has a function of transmitting and receiving information to and from the communication unit 270 of the vehicle control device 20. Communication unit 420 receives information transmitted from the vehicle control device 20 to remote control device 40 via communication unit 270 when it is determined by the CPU 20A of vehicle control device 20 that the manual driving is difficult. Then, the remote control information generated by operation information generating section 410 is transmitted to the vehicle control device 20. Also, communication unit 420 is capable of transmitting the advice information provided by the remote driver to the communication unit 270 of the vehicle control device 20.

The notification unit 430 can receive information transmitted from the communication unit 420 and has a function of receiving a switching notification transmitted from the vehicle control device 20 to the remote operation device 16 indicating that driving is difficult. Note that the notification unit 430 further has a function of transmitting a switching notification to the vehicle control device 20 before switching from the remote driving to the manual driving.

The operation switching unit 440 has a function of switching to the remote operation with respect to the vehicle control device 20. In the remote control device 16, when the remote driver performing remote driving operates a switch such as a switch button (not shown), a switching signal or a switching preparation signal for switching from the manual driving to the remote driving is output to the vehicle control device 20.

For example, when the information related to the operation authority has already been received from the vehicle control device 20 of the vehicle 12, the operation switching unit 440 outputs a switching signal to the vehicle control device 20 so that switching from the manual driving to the remote driving is enabled at the vehicle 12.

Further, for example, when the operation switching unit 440 transmits the switching preparation signal to the vehicle control device 20 first, switching from the manual driving to the remote driving is enabled at the vehicle 12 at a stage at which the operation authority is provided in the operation switching unit 290 of the vehicle control device 20. The operation switching unit 440 can also switch the vehicle 12 from the remote driving to the manual driving.

Information Server

Figure 6:
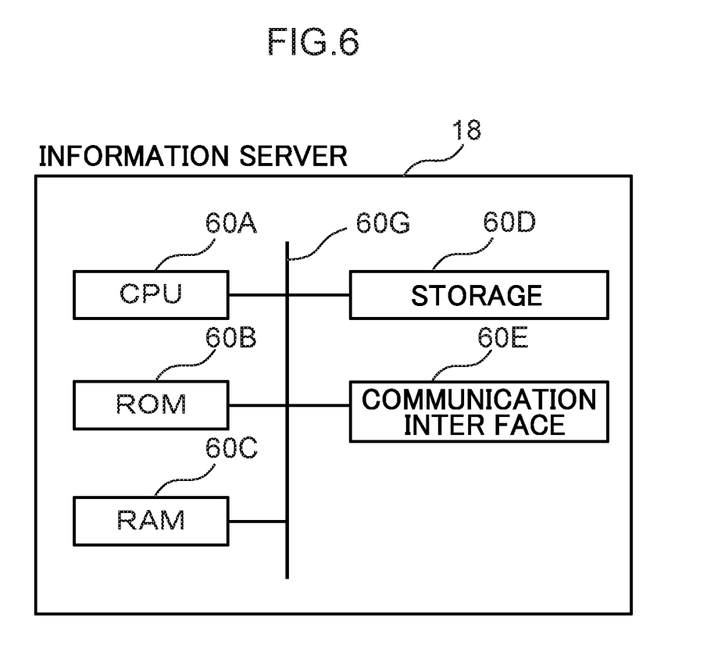
FIG. 6 is a block diagram showing one hardware configuration used in the vehicle travel system according to the present embodiment.

FIG. 6 shows a block diagram illustrating a hardware configuration of the information server 18 used in the vehicle travel system according to the present embodiment.

As illustrated in FIG. 6, the processing server 18 includes CPU 60A, ROM 60B, RAM 60C, storage 60D, and a communication I/F 60E. The CPU 60A, ROM 60B, RAM 60C, storage 60D, and communication I/F 60E are connected so as to be capable of communicating with each other through a bus 60G.

The functions of the CPU 60A, the ROM 60B, the RAM 60C, the storage 60D, and the communication I/F 60E are substantially the same as those of the CPU 20A, the ROM 20B, the RAM 20C, the storage 20D, and the communication I/F 20E of the vehicle control device 20 shown in FIG. 2 and discussed above.

The CPU 60A shown in FIG. 6 reads a program from the ROM 60B or the storage 60D, and executes the program employing the RAM 60C as a workspace.

In the present exemplary embodiment, an information processing program is stored in the storage 60D. When the CPU 60A executes the information processing program, the external information acquisition unit 600 and the peripheral information generation unit 610 illustrated in FIG. 7 function.

Figure 7:
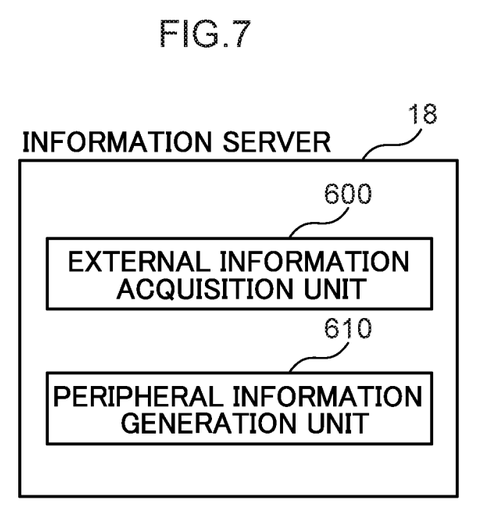
FIG. 7 is a block diagram showing an example of a functional configuration of an information server used in the vehicle travel system according to the present embodiment.

FIG. 7 is a block diagram illustrating an example of functional configuration of the information server 18. As shown in FIG. 7, the information server 18 has an external information acquisition unit 600 and a peripheral information generation unit 610.

The external information acquisition unit 600 has a function of acquiring various kinds of information from outside the information server 18. The acquired information includes weather information, earthquake information, traffic information, news information, and information acquired by sensors of other vehicles.

The peripheral information generation unit 610 has a function of generating peripheral information to be transmitted to the vehicle control device 20 based on the information acquired by the external information acquisition unit 600. For example, the peripheral information generation unit 610 generates information about the periphery of the current location of the vehicle 12 from the information acquired by the external information acquisition unit 600 as peripheral information for the vehicle 12.

Operation and Effect of Vehicle

Explanation follows regarding operation and advantageous effects of the vehicle according to the present exemplary embodiment.

The vehicle 12 in the present embodiment is capable of at least manual driving and remote driving. As shown in FIGS. 1 and 2, the communication unit 270 of the vehicle control device 20 is capable of communication with the communication unit 420 of the remote control device 40. Based on the driver information, it is possible to switch from the manual driving driven by the driver to the remote driving operated by the remote driver.

First, the driver information is stored in the storage 20D of the vehicle control device 20. In the present embodiment, an example of a flow of a registration process for a driver to register driver information will be described with reference to FIGS. 2 and 3 and a flowchart illustrated in FIG. 8.

Figure 8:
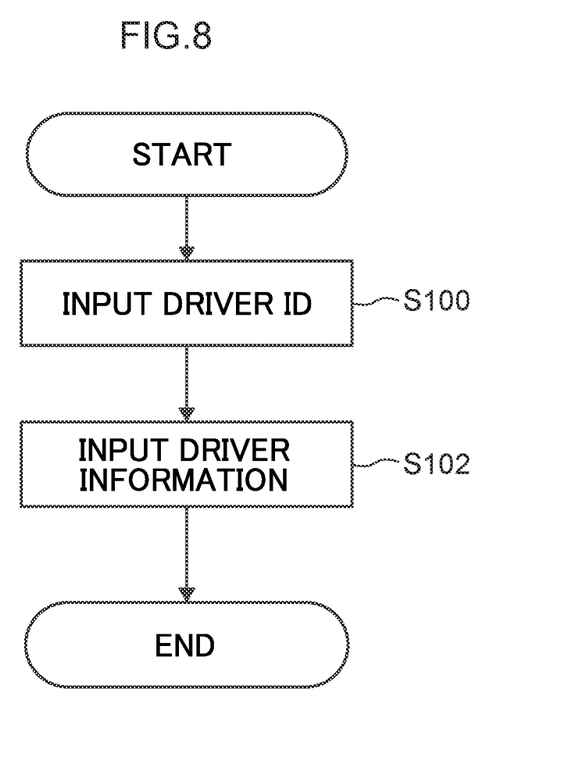
FIG. 8 is a flowchart showing a flow of a registration process for registering driver information in the vehicle travel system according to the present embodiment.

As shown in FIG. 8, in step S100, the driver information acquisition unit 260 accepts the registration of the driver ID by the driver and registers it in the storage 20D or the like. Note that the driver ID is information for specifying the driver.

Next, in step S102, the driver information acquisition unit 260 receives the driver's input of the driver information, registers it in the storage 20D or the like, and ends the flow of the registration process in which the driver registers the driver information. Here, the "driver information" is information indicating a specific situation that the driver is not good at as described above.

The driver ID and the driver information are input by the input unit 35 provided in the vehicle 12. When the information is input by the input unit 35, the information is stored in the storage 20D, and the driver ID and the difficult specific situation are associated with each other. Then, the registration information shown in FIG. 8 is realized by the CPU 20A reading the registration processing program stored in the storage 20D or the like and expanding it in the RAM 20C.

Hereinafter, an example of a switching process flow for switching between manual driving of the vehicle 12 and remote driving by the remote control device 16 in accordance with the driver information will be described with reference to FIGS. 2 to 5 and the flowchart shown in FIG. 9.

Figure 9:
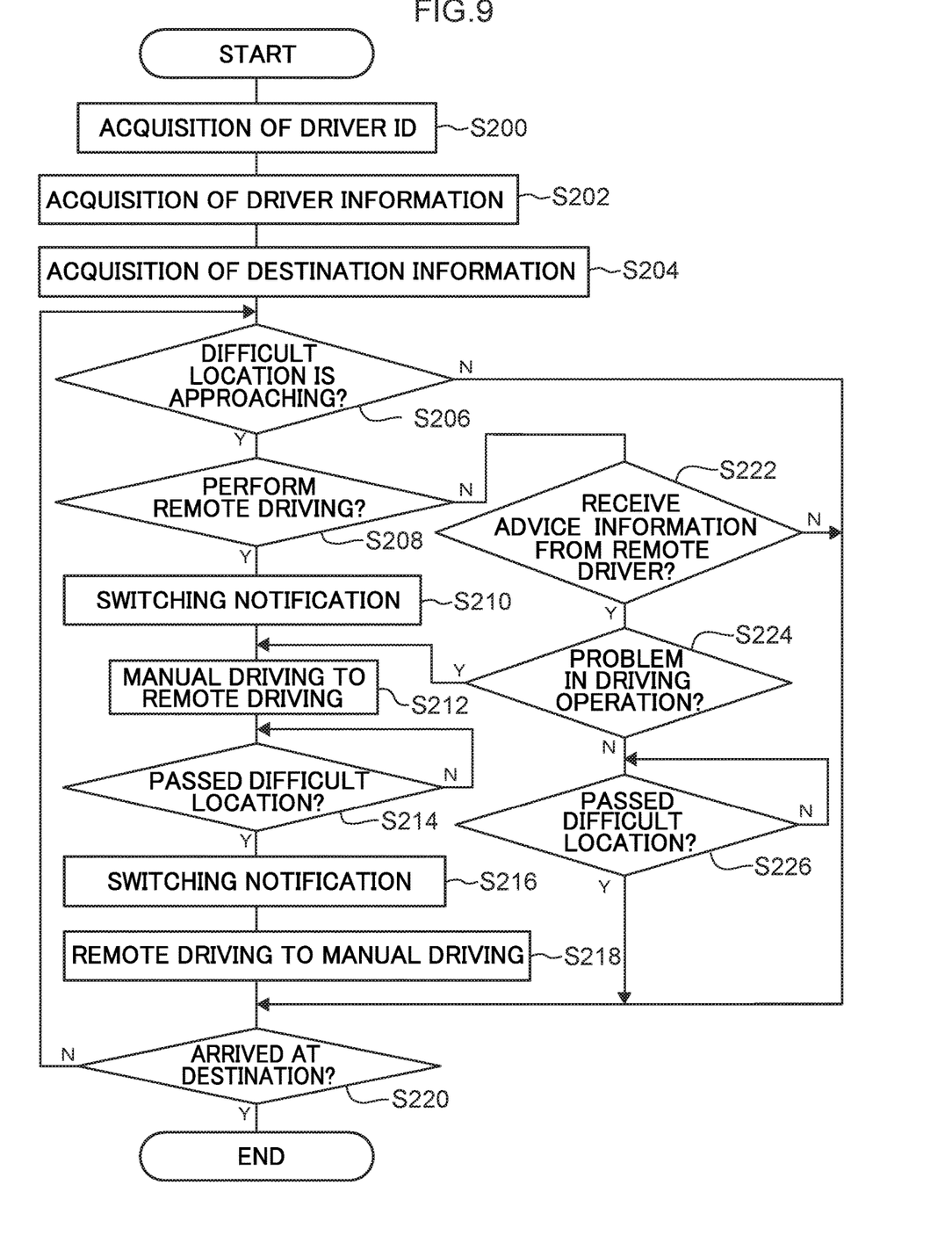
FIG. 9 is a flowchart illustrating a flow of a switching process for performing switching from manual driving to remote driving or the like according to driver information in the vehicle travel system according to the present embodiment.

In FIG. 9, in order to make the flow of the switching process easier to understand, a difficult location is described as an example of a specific situation. Note that this switching process is realized by the CPU 20A reading a registration processing program stored in the storage 20D or the like and expanding the program in the RAM 20C.

As shown in FIG. 9, in step S200, the CPU 20A acquires a driver ID registered in the storage 20D. Further, in step S202, the CPU 20A acquires driver information. Thereby, a specific situation that the driver is not good at is acquired. Next, in step S204, the CPU 20A acquires information on the destination.

Thereby, for example, the difficult location is detected in the route to the destination based on the driver information corresponding to the driver ID. It is also possible to change the route to the destination and avoid the difficult location.

Then, at the time of traveling of the vehicle 12, in step S206, the CPU 20A determines whether or not the difficult location included in the driver information is approaching. If it is not determined in step S206 that the difficult location is approaching, that is, if step S206 is NO, the process proceeds to step S220. On the other hand, when it is determined that the difficult location is approaching, that is, when step S206 is YES, the process proceeds to step S208.

In step S208, the CPU 20A determines whether to perform the remote driving. If it is determined in step S208 that the remote driving is to be performed, that is, if step S208 is YES, the process proceeds to step S210.

In step S210, the CPU 20A transmits a switching notification indicating that the manual driving is difficult from the notification unit 280 of the vehicle control device 20 to the notification unit 430 of the remote control device 40. Thereafter, the process proceeds to step S212.

In step S212, the CPU 20A switches the vehicle 12 from the manual driving to the remote driving. Thereby, the remote driving by the remote driver is performed. Here, in the vehicle control device 20, the operation authority is transferred to the remote driver by performing the switching by the operation switching unit 290.

That is, after the switching by the operation switching unit 290 of the vehicle control device 20 is executed, the operation switching unit 440 of the remote control device 40 outputs a switching signal for switching to the remote driving to the vehicle control device 20. As a result, in the vehicle 12, switching from the manual driving to the remote driving is performed.

After the vehicle 12 is switched from the manual driving to the remote driving in step S212, the process proceeds to step S214. Then, in step S214, the CPU 20A determines whether or not the vehicle has passed the difficult location. Note that, in step S214, this processing is performed until the vehicle passes the difficult location.

If it is determined in step S214 that the difficult location has been passed, that is, if step S214 is YES, the process proceeds to step S216.

In step S216, the CPU 20A receives the switching notification for switching from the remote driving to the manual driving transmitted from the notification unit 430 of the remote control device 40 to the notification unit 280 of the vehicle control device 20, and sends a switching notification to switch from the remote driving to the manual driving. In step S216, the switch notification for switching from the remote driving to the manual driving is transmitted to the vehicle 12, and then the process proceeds to step S218.

In step S218, CPU 20A switches vehicle 12 from the remote driving to the manual driving. Thereby, the vehicle 12 is manually driven by the driver. Here, in the remote control device 40, the operation authority is transferred to the driver of the vehicle 12 by executing the switching by the operation switching unit 440.

That is, after the switching by the operation switching unit 440 of the remote control device 40 is executed, the operation switching unit 290 of the vehicle control device 20 outputs a switching signal for switching to the manual driving to the vehicle control device 20. As a result, in the vehicle 12, switching from the remote driving to the manual driving is performed.

In step S218, after the vehicle 12 is switched from the remote driving to the manual driving by the CPU 20A, the CPU 20A proceeds to step S220.

In step S220, the CPU 20A determines whether or not it has arrived at the destination. If it is determined in step S220 that the vehicle has arrived at the destination, that is, if step S220 is YES, the flow of the switching process of switching the driving according to the driver information, ends. If it is determined in step S220 that the vehicle has not reached the destination, that is, if step S220 is NO, the CPU 20A returns to step S206.

If it is determined in step S208 that remote driving is not to be performed, that is, if step S208 is NO, the process proceeds to step S222. That is, although it is a place where the driver is not good at, the manual driving by the driver is performed. Then, in step S222, CPU 20A determines whether or not to receive the advice information from the remote driver.

If it is determined in step S222 that the advice information from the remote driver will not be received, that is, if step S222 is NO, the process proceeds to step S220.

On the other hand, if it is determined in step S222 that the advice information from the remote driver will be received, that is, if step S222 is YES, the CPU 20A receives driver information via the communication unit 420 of the remote control device 40 and the communication unit 270 of the vehicle control device 20, and advice information is transmitted. Thus, advice to the driver is given by the remote driver.

Next, the CPU 20A proceeds to step S224. In step S224, the CPU 20A determines whether there is a problem in the driving operation. If it is determined in step S224 that there is a problem in the driving operation, that is, if step S224 is YES, CPU 20A proceeds to step S212. That is, the CPU 20A switches the vehicle 12 from the manual driving to the remote driving.

If it is determined in step S224 that there is no problem in the driving operation, that is, if step S224 is NO, the CPU 20A proceeds to step S226.

In step S226, the CPU 20A determines whether or not the vehicle has passed the difficult location. Note that, in step S226, this processing is performed until the vehicle passes the difficult location. If it is determined in step S226 that the vehicle has passed the difficult location, the process proceeds to step S220.

As described above, in the present embodiment, it is possible to switch from the manual driving to the remote driving based on the driver information stored in the storage 20D of the vehicle control device 20 shown in FIG. 2. In the present embodiment, the driver information is updated at any time after the end of driving. Then, when the vehicle 12 is switched from the manual driving to the remote driving by the operation switching unit 290 shown in FIG. 3, the vehicle 12 can be remotely driven by the remote driver.

That is, in the present embodiment, when the remote driving is required, the remote driving is performed by the remote driver, and the driver can avoid the manual driving in a specific situation, that is, a situation in which it is difficult to perform manual driving. In other words, in the present embodiment, the driver performs the manual driving in locations other than the specific situation. For this reason, in the present embodiment, the remote driver does not need to always perform the remote driving, and only has to stand by as necessary, and the burden on the remote driver is reduced.

Here, in the present embodiment, the driver information includes at least one of a difficult place and a difficult state as a specific situation. That is, the driver information can be subdivided to cover a specific situation in a wide range.

In the present embodiment, the communication unit 270 of the vehicle control device 20 and the communication unit 420 of the remote control device 40 are provided. This enables communication between the driver performing the manual driving and the remote driver performing the remote driving.

That is, the remote driver can advise the driver via the communication unit 270 of the vehicle control device 20 shown in FIG. 3 and the communication unit 420 of the remote control device 40 shown in FIG. 5 in accordance with the driver information.

Therefore, in the specific situation, when the driver receives the advice from the remote driver, the driver can improve the driving technique and overcome the specific situation. For this reason, the vehicle 12 in the present embodiment can also be used as a training vehicle.

Further, in the present embodiment, the driver information is stored in the storage 20D shown in FIG. 2. When a destination is input to the navigation system 30, a difficult location can be detected in advance based on the driver information stored in the storage 20D. For this reason, for example, a route to avoid the difficult location can be selected in advance.

Further, as shown in FIG. 3, the vehicle control device 20 includes the operation switching unit 290 that enables the driver to switch from the manual driving to the remote driving. By the operation switching unit 290 being executed by the driver, the vehicle 12 can be switched from the manual driving to the remote driving.

This allows the driver to switch from the manual driving to the remote driving while the vehicle is traveling, without being limited to places where he/she is not good, and the driver can take a break during that time.

Further, as shown in FIG. 5, the remote control device 40 includes the operation switching unit 440 that enables the remote driver to switch from the manual driving to the remote driving. Execution of the operation switching unit 440 by the remote driver enables switching from the manual driving to the remote driving in the vehicle 12 shown in FIG. 1.

For example, when it is determined by the remote driver that there is danger based on the traveling state of the driver's manual driving, the manual driving can be switched to the remote driving by the remote driver.

Further, the vehicle control device 20 includes the notification unit 280 that transmits a switching notification to the remote driver when the driver switches from the manual driving to the remote driving by the operation switching unit 290. On the other hand, the remote control device 40 includes the notification unit 430 that receives the switching notification to the remote driver when switching from the manual driving to the remote driving.

Therefore, when the driver switches from the manual driving to the remote driving by executing the operation switching unit 290, the switching notification transmitted by the notification unit 280 is received by the notification unit 430. Thus, the remote driver can be informed in advance that the operation will be switched from the manual driving to the remote driving.

The driver information acquisition unit 260 shown in FIG. 3 acquires the specific situation from the driver information obtained by registering the driver, but the present invention is not limited to this.

For example, the driver information acquisition unit 260 may acquire the driver's physical information from the biological sensor 34 via the input/output I/F 20F. In this case, when it is estimated that the driver is in a nervous state from the driver's physical information transmitted from the biological sensor 34, the CPU 20A determines that the driver is in a specific situation. A place that the driver does not feel as a difficult place, is newly stored as a specific situation.

In addition, the driver information acquisition unit 260 may be set so that the driving state is acquired from the operation device 32 via the input/output I/F 20F. In this case, a detection unit (not shown) is connected to the operation device 32, and the detection unit detects a driving state of the driver, such as a brake-prone section, a steering angle, or the like, when the vehicle is running. Thereby, the driver is determined to be in a specific situation. As in the case of the biometric sensor 34, a new situation is stored as a specific situation at a place that the driver does not feel as a difficult place.

In the above embodiment, the vehicle 12 is described as an example of an automobile, but the vehicle in the present invention is not limited to an automobile, but can be applied to a bus or a train.

Further, in the above-described embodiment, various kinds of processors other than the CPU may execute the process of reading and executing the software program by the CPU 20A illustrated in FIG. 2 and the process of reading and executing the software program by the CPU 40A illustrated in FIG. 4. Examples of such processors include programmable logic devices (PLD) with circuit configurations that are reconfigurable after manufacture, such as field-programmable gate arrays (FPGA), and dedicated electronic circuits that are processors including circuit configurations custom designed to execute specific processing, such as application specific integrated circuits (ASIC).

Moreover, the processing performed by the CPU 20A and the CPU 40A may be executed by one of such processors, or may be executed by a combination of two or more processors of the same type or different types (for example, plural FPGAs, or a combination of a CPU and an FPGA). More specific examples of hardware structures of such processors include electronic circuits configured by combining circuit elements, such as semiconductor devices.

In the exemplary embodiments described above, explanation has been given in which the programs are provided in a format pre-stored on a non-transient computer-readable recording medium. For example, the execution program in vehicle control device 20 shown in FIG. 2 is stored in ROM 20B in advance.

In the remote control device 40 of the remote control device 16 shown in FIG. 4, a processing program is stored in the ROM 40B in advance. However, there is no limitation thereof, and the respective programs may be provided in a format stored on a non-transient recording medium such as Compact Disc Read Only Memory (CD-ROM), Digital Versatile Disc Read Only Memory (DVD-ROM), or Universal Serial Bus (USB) memory. Moreover, each of the programs may be provided in a format for downloading from an external device over a network.

The processing flows described in the above exemplary embodiment are merely examples thereof, and unnecessary steps may be omitted, new steps added, or the processing sequence changed within a range not departing from the spirit thereof.

Respective configurations of the respective controllers and the processing server in the exemplary embodiments described above are merely exemplary, and may be modified according to circumstances within a range not departing from the scope of the present disclosure.

What is claimed is:

1. A vehicle travel system for a vehicle that is configured to be switchable between at least manual driving and remote driving, the vehicle comprising a first memory and a first processor connected to the first memory, and the first processor being configured to:
   acquire driver information related to a driver that manually drives the vehicle, the driver information indicating a specific situation in which the driver desires to avoid the manual driving, the specific situation being input by the driver and stored in the first memory by the first processor in advance in accordance with the input by the driver, the specific situation being at least one of (i) one or more locations identified by the driver or (ii) one or more driving conditions identified by the driver, and
   switch the manual driving to the remote driving upon occurrence of the specific situation indicated by the acquired driver information.

2. The vehicle travel system according to claim 1, further comprising a remote controller configured to communicate with the vehicle, and configured for an operator to operate the remote controller and remotely drive the vehicle.

3. The vehicle travel system according to claim 2, wherein the first processor is configured to receive advice information from the operator in the specific situation.

4. The vehicle travel system according to claim 2, wherein the first processor transmits a switching notification to the remote controller in a case of switching from the manual driving to the remote driving.

5. The vehicle travel system according to claim 4, wherein:
   the remote controller comprises a second memory and a second processor connected to the second memory, and
   the second processor, after receiving the switching notification regarding switching from the manual driving to the remote driving from the first processor, outputs a switching signal that performs switching to the remote driving to the first processor.

6. The vehicle travel system according to claim 5, wherein the first processor, after receiving the switching notification regarding switching from the remote driving to the manual driving from the second processor, outputs a switching signal that performs switching to the manual driving.

7. A method of vehicle control for a vehicle that is configured to be switchable between at least manual driving and remote driving, the method being performed by a processor configured to perform the steps of:
   acquiring driver information related to a driver that manually drives the vehicle, the driver information indicating a specific situation in which the driver desires to avoid the manual driving, the specific situation being input by the driver and stored in a memory by the processor in advance in accordance with the input by the driver, the specific situation being at least one of (i) one or more locations identified by the driver or (ii) one or more driving conditions identified by the driver, and
   switching the manual driving to the remote driving upon occurrence of the specific situation indicated by the acquired driver information.

8. The method of vehicle control according to claim 7, wherein the remote driving includes an operator remotely driving the vehicle by operating a remote controller that is separate from the vehicle.

9. The method of vehicle control according to claim 8, wherein the processor is configured to receive advice information from the operator in the specific situation.

10. The method of vehicle control according to claim 8, wherein the processor transmits a switching notification to the remote controller in a case of switching from the manual driving to the remote driving.

11. The vehicle travel system according to claim 1, wherein the first memory stores the driver information indicating the specific situation in association with a driver ID that identifies the driver.

12. The vehicle travel system according to claim 1, wherein the first processor acquires the driver information indicating the specific situation from the first memory when a destination is input into a navigation system of the vehicle.

13. The method of vehicle control according to claim 7, wherein the driver information indicating the specific situation is stored in the memory in association with a driver ID that identifies the driver.

14. The method of vehicle control according to claim 7, wherein the processor acquires the driver information indicating the specific situation from the memory when a destination is input into a navigation system of the vehicle.

* * * * *